US010179588B2

(12) United States Patent
Takamatsu

(10) Patent No.: US 10,179,588 B2
(45) Date of Patent: Jan. 15, 2019

(54) AUTONOMOUS VEHICLE CONTROL SYSTEM

(71) Applicant: NISSAN NORTH AMERICA, INC., Franklin, TN (US)

(72) Inventor: Yoshiro Takamatsu, Sunnyvale, CA (US)

(73) Assignee: Nissan North America, Inc., Franklin, TN (US)

(*) Notice: Subject to any disclaimer, the term of this patent is extended or adjusted under 35 U.S.C. 154(b) by 0 days.

(21) Appl. No.: 15/302,878

(22) PCT Filed: Apr. 11, 2014

(86) PCT No.: PCT/US2014/033808
§ 371 (c)(1),
(2) Date: Oct. 7, 2016

(87) PCT Pub. No.: WO2015/156818
PCT Pub. Date: Oct. 15, 2015

(65) Prior Publication Data
US 2017/0036678 A1 Feb. 9, 2017

(51) Int. Cl.
G05D 1/02 (2006.01)
B60W 30/18 (2012.01)
(Continued)

(52) U.S. Cl.
CPC ...... *B60W 30/18163* (2013.01); *B60W 10/04* (2013.01); *B60W 10/20* (2013.01); *B60W 30/12* (2013.01); *B60W 30/16* (2013.01); *B60W 50/08* (2013.01); *G05D 1/0088* (2013.01); *G05D 1/0212* (2013.01); *G05D 1/0234* (2013.01); *B60W 2420/42* (2013.01);

*B60W 2550/20* (2013.01); *B60W 2550/306* (2013.01); *B60W 2550/308* (2013.01); *B60W 2710/207* (2013.01);
(Continued)

(58) Field of Classification Search
CPC ...... G05D 1/02; G05D 1/0289; G05D 1/0212; G05D 1/0094
USPC .......................................................... 701/23
See application file for complete search history.

(56) References Cited

U.S. PATENT DOCUMENTS 5,796,350 A * 8/1998 Fuse ...................... B60K 35/00
340/439
8,384,534 B2 * 2/2013 James .................... B60Q 9/008
340/435

(Continued)

OTHER PUBLICATIONS

International Search Report in PCT/US2014/033808 dated Nov. 4, 2014.

*Primary Examiner* — Tan Q Nguyen
(74) *Attorney, Agent, or Firm* — Global IP Counselors, LLP

(57) ABSTRACT

An autonomous vehicle control system includes a sensing system, a remote vehicle determination system and a controller. The sensing system is disposed on a host vehicle and is configured to sense a visual condition of a driver of the host vehicle. The remote vehicle determination system is disposed on the host vehicle, and is configured to determine a position of a remote vehicle in an area adjacent the host vehicle. The controller is configured to control the autonomous vehicle control system to move the host vehicle relative to a lane marker based on the visual condition and the position of a remote vehicle.

18 Claims, 8 Drawing Sheets

(51) Int. Cl.
*B60W 10/04* (2006.01)
*B60W 10/20* (2006.01)
*B60W 30/12* (2006.01)
*B60W 30/16* (2012.01)
*B60W 50/08* (2012.01)
*G05D 1/00* (2006.01)

(52) U.S. Cl.
CPC . *B60W 2720/10* (2013.01); *G05D 2201/0213* (2013.01)

(56) References Cited

U.S. PATENT DOCUMENTS

| | | | |
|---|---|---|---|
| 9,701,340 B1* | 7/2017 | Lan | B62D 15/025 |
| 2002/0188404 A1* | 12/2002 | Jeon | B62D 15/025 |
| | | | 701/301 |
| 2004/0150514 A1* | 8/2004 | Newman | B60Q 9/008 |
| | | | 340/435 |
| 2009/0243880 A1* | 10/2009 | Kiuchi | G01B 11/26 |
| | | | 340/903 |
| 2009/0299573 A1* | 12/2009 | Thrun | B62D 15/025 |
| | | | 701/41 |
| 2010/0228420 A1* | 9/2010 | Lee | B62D 1/28 |
| | | | 701/26 |
| 2012/0212353 A1 | 8/2012 | Fung et al. | |
| 2013/0274986 A1* | 10/2013 | Trepagnier | G01S 17/023 |
| | | | 701/26 |

* cited by examiner

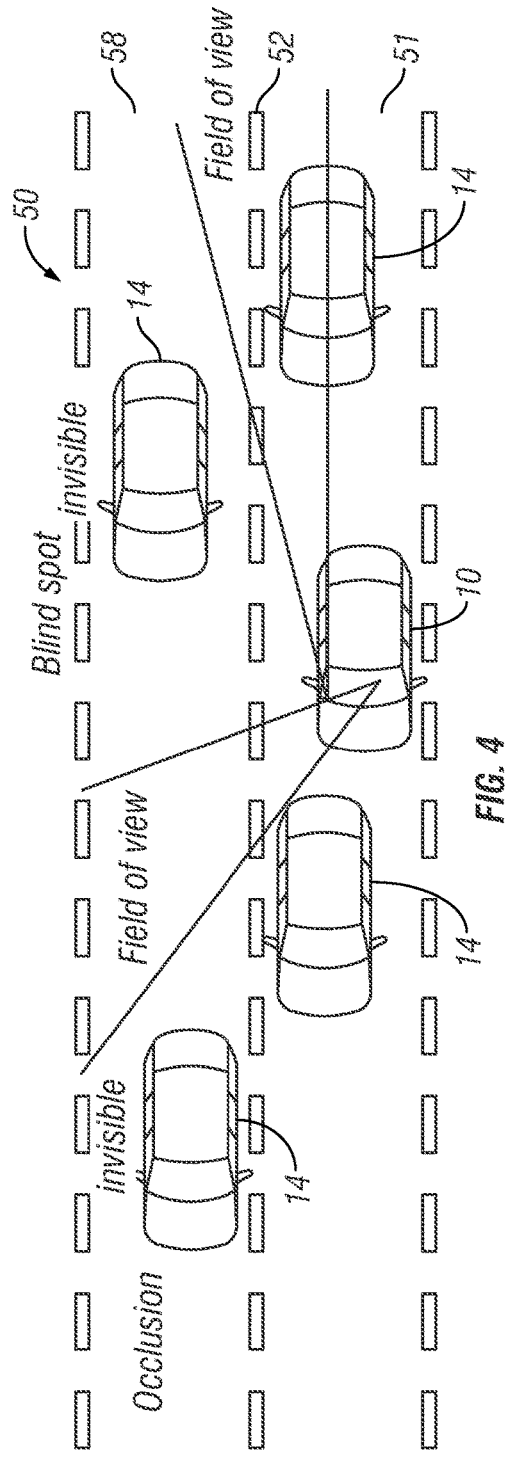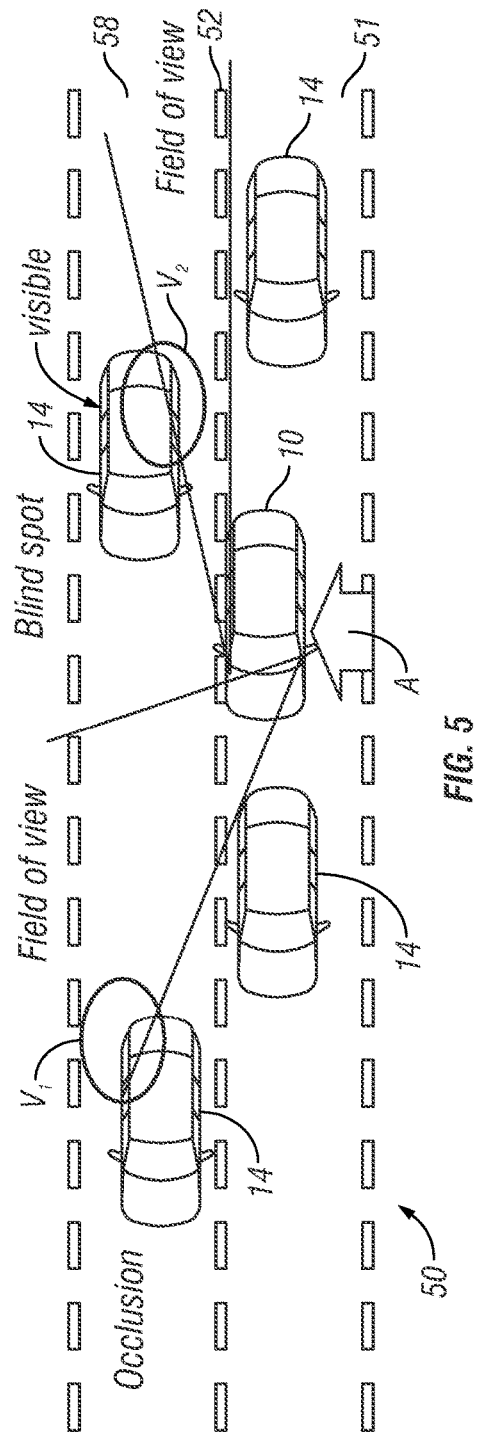
FIG. 4
FIG. 5

AUTONOMOUS VEHICLE CONTROL SYSTEM

BACKGROUND

Field of the Invention

The present invention generally relates to a vehicle control system and method. More specifically, the present invention relates to a vehicle control system and method that is configured to control a host vehicle to move the vehicle to improve the driver's viewing positioning during lane change operations.

Background Information

As understood in the art, an autonomous vehicle includes a control system that is capable of performing driving operations to guide the vehicle to a predetermined destination without input from the driver or with only minimal input from the driver. The control system typically uses a plurality of high speed cameras to monitor areas surrounding the vehicle. The cameras detect, for example, traffic lights, signs, intersection markers, other vehicles and obstacles, and provide visual data to the control system. The control system can analyze this data to control driving of the vehicle during travel, and can control the speed and direction of the vehicle to move the vehicle at an appropriate location.

Conventional vehicle control systems compute the position of a vehicle by comparing an image of a stored three dimensional map and a camera image. In particular, an edge image is extracted from an actual image acquired by a vehicle camera with which the vehicle is equipped. The position and attitude angle of the vehicle camera is adjusted so that a virtual image from a three dimensional map which recorded the position and type of edge of the environment by three dimensions is projected on the positional attitude of the vehicle camera. Accordingly, the position and attitude angle in three dimensional space of the vehicle camera can be estimated.

Moreover, successive images from cameras can be compared to determine the movement of the vehicle. Specifically, by comparing the location of a plurality of matching pixels from successive images, distance information can be obtained. The distance information can be compiled to determine movement of the vehicle in various directions and angles.

SUMMARY

It has been discovered that in autonomous vehicles, situations may arise during which the driver may want to assume control or direct the autonomous vehicle or be uncomfortable with the driver decisions of the vehicle control systems. For instance, the driver may wish to monitor the conditions during a lane change operation or to cause a lane change operation. However, due to the location of the host vehicle and the host vehicle's position relative to remote vehicles, the driver may not be able to observe all of the surrounding remote vehicles. Therefore, a need exists for an improved autonomous vehicle control system.

In accordance with one aspect of the present disclosure, an autonomous vehicle control system comprises a sensing system, a remote vehicle determination system and a controller. The sensing system is disposal on a host vehicle and is configured to sense a visual condition of a driver of the host vehicle. The remote vehicle determination system is disposed on the host vehicle, and is configured to determine a position of a remote vehicle in an area adjacent the host vehicle. The controller is configured to control the autonomous vehicle control system to move the host vehicle relative to a lane marker based on the visual condition and the position of a remote vehicle.

In another embodiment, a method of operation of an autonomous vehicle comprises determining a distance of a vehicle to a lane marker defining an edge of a lane, determining a lane change operation of the vehicle is desired, moving the vehicle a first distance from the lane marker to a second distance from the lane marker in response to the determination of the desired lane change operation, the second distance being less than the first distance and performing a lane change operation after the vehicle is at the second distance for more than at least one of a predetermined period of time and a predetermined distance.

BRIEF DESCRIPTION OF THE DRAWINGS

Referring now to the attached drawings which form a part of this original disclosure:

FIG. 4 is a diagrammatic view of a host vehicle and remote vehicles traveling on a road;

FIG. 5 is a diagrammatic view of the host vehicle and remote vehicles traveling on the road shown in FIG. 5 with the host vehicle moving toward the lane marker;

DETAILED DESCRIPTION OF EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
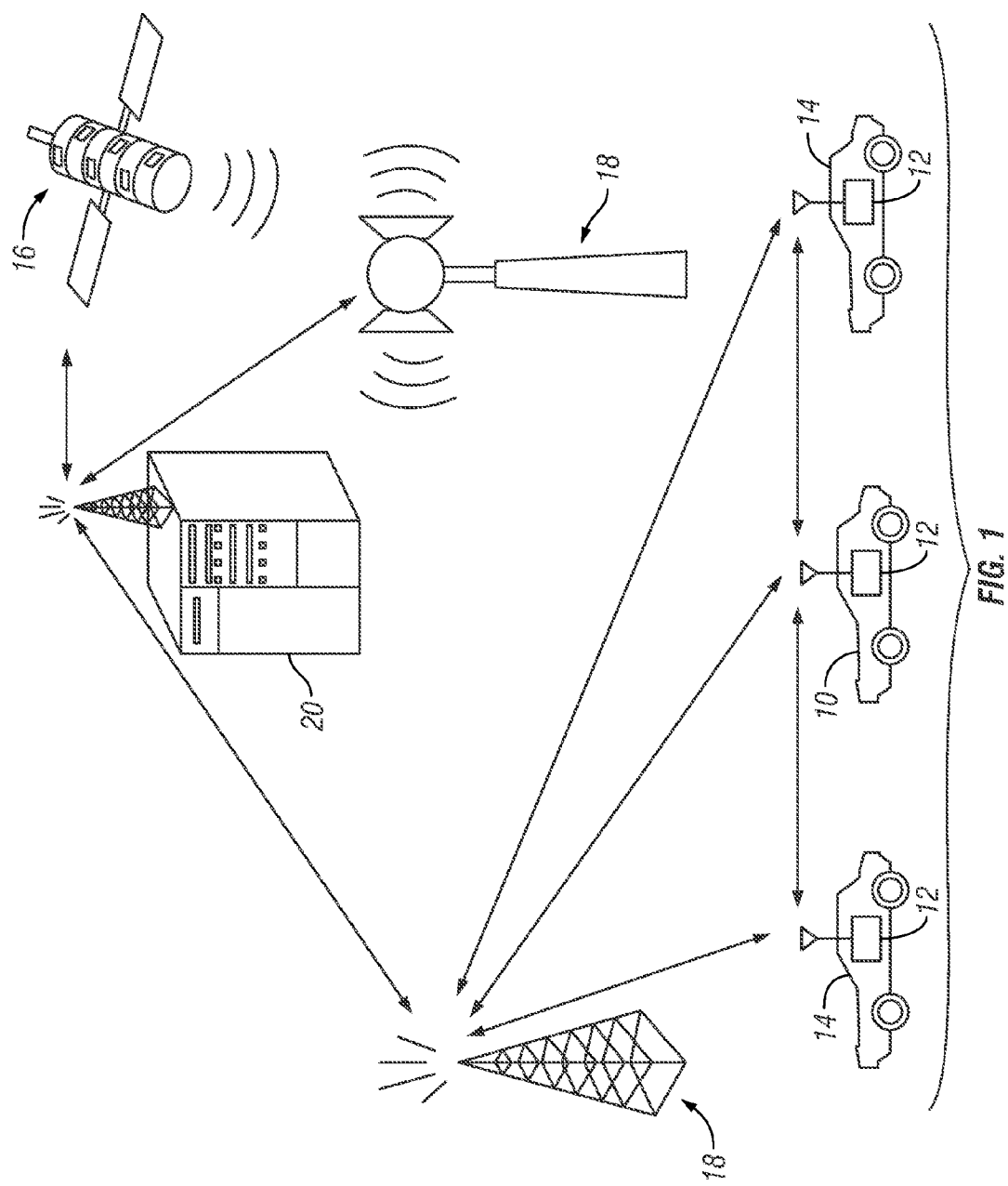
FIG. 1 is a block diagram illustrating an example of a host vehicle equipped with an vehicle control system according to embodiments disclosed herein in relation to remote vehicles and components of a wireless communication network.

FIG. 1 is a block diagram illustrating a host vehicle (HV) 10 that is equipped with vehicle control system 12 according to a disclosed embodiment that can control an autonomous vehicle control system on board the host vehicle 10 to move the host vehicle 10 to a location that is advantageous to the driver as discussed herein. The host vehicle 10 can also be referred to as a subject vehicle (SV). The vehicle control system 12 is generally capable of communicating with at least one remote vehicle (RV) 14 that can also include a vehicle control system 12. Alternatively, the remote vehicle 14 can include another type of two-way communication system, such as an adaptive cruise control system, that is capable of communicating information about at least the location and speed of the remote vehicle 14 as understood in the art.

The vehicle control system 12 of the host vehicle 10 and the remote vehicle 14 may communicate with a two-way wireless communications network. As seen in FIG. 1, for example, the two-way wireless communications network can include one or more global positioning satellites 16 (only one shown), and one or more terrestrial units, such as roadside (terrestrial) units 18 (two are shown), and a base station or external server 20. The global positioning satellites 16 and the roadside units 18 send and receive signals to and from the vehicle control system 12 of the host vehicle 10 and the remote vehicles 14. The base station 20 sends and receives signals to and from the vehicle control system 12 of the host vehicle 10 and the remote vehicles 14 via a network of the roadside units 18, or any other suitable two-way wireless communications network.

Figure 2:
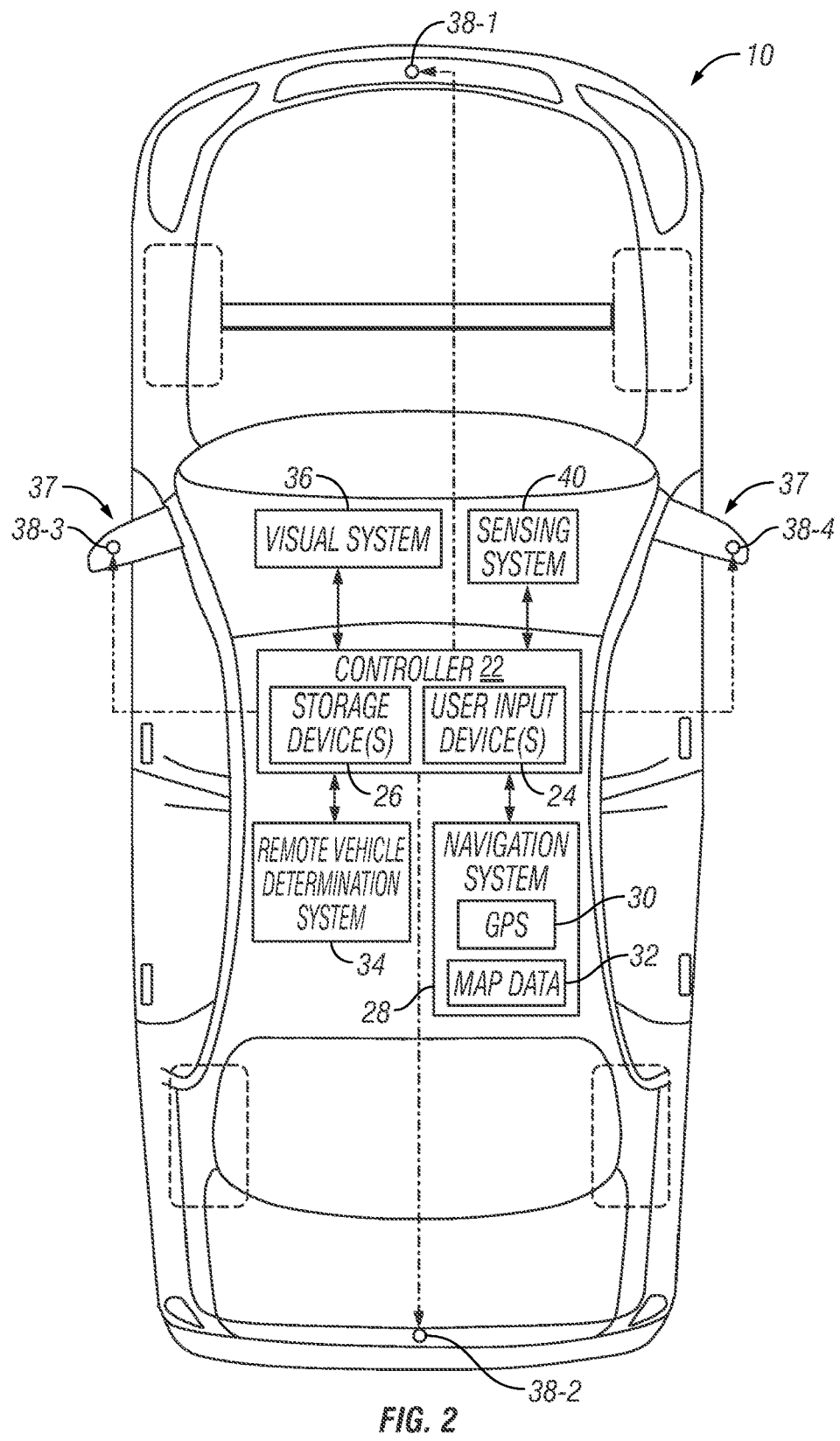
FIG. 2 is a block diagram of exemplary components of the host vehicle equipped with an vehicle control system according to embodiments disclosed herein.
Figure 3:
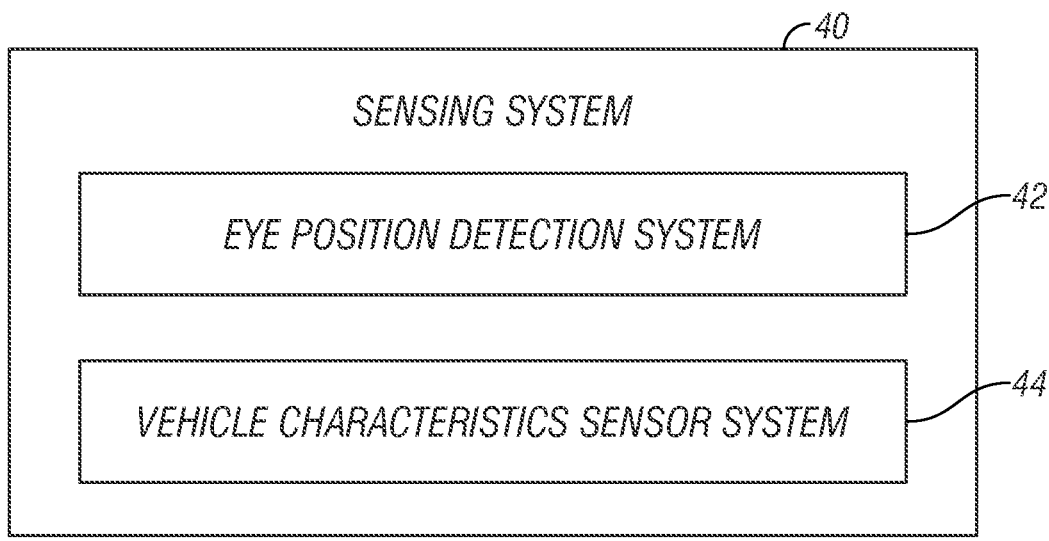
FIG. 3 is a block diagram of exemplary components of a sensing system of the vehicle control system as shown in FIG. 2.

As shown in more detail in FIGS. 2 and 3, the vehicle control system 12 includes a controller 22. The controller 22 preferably includes a microcomputer with a control program that controls the components of the vehicle control system 12 as discussed below. The controller 22 includes other conventional components such as an input interface circuit, an output interface circuit, and storage devices such as a ROM (Read Only Memory) device and a RAM (Random Access Memory) device. The microcomputer of the controller 22 is at least programmed to control the vehicle control system 12 in accordance with the flow chart of FIG. 4 discussed below. It will be apparent to those skilled in the art from this disclosure that the precise structure and algorithms for the controller 22 can be any combination of hardware and software that will carry out the functions of the present invention. Furthermore, the controller 22 can communicate with the other components of the vehicle control system 12 via, for example a controller 22 area network (CAN) bus or in any other suitable manner as understood in the art.

As shown in more detail in FIG. 2, the controller 22 can include or be in communication with user input devices 24. The user input devices 24 can include, for example, a human-machine interface (HMI) which enables a user (e.g., the driver and/or passenger) to interact with the vehicle control system 12 as understood in the art and discussed herein. The controller 22 can further include or be in communication with one or more storage devices 26 which can store information as discussed herein.

As further shown in FIG. 2, the vehicle control system 12 in this example includes or is in communication with a vehicle navigation system 28. The vehicle navigation system 28 can be, for example, a global positioning system (GPS) navigation system or any other suitable type of navigation system as known in the art. The vehicle navigation system 28 includes, for example, a communication device 30, such as a GPS communication device that communicates with the GPS satellites 16, as shown in FIG. 1. The communication device 30 can also communicate with one or more terrestrial units 18 and a base station or external server 20 to obtain location information. Furthermore, the vehicle navigation system 28 in this example includes or is in communication with a storage device 32 that can store map data and other location related data as understood in the art.

The vehicle control system 12 in this example also includes or is in communication with a remote vehicle determination system 34. As understood in the art, the remote vehicle determination system 34 communicates with the remote vehicles 14 within a communication range of the host vehicle 10 to exchange vehicle data between the host vehicle 10 and the remote vehicles 14. This vehicle data received from a remote vehicle 14 can include information pertaining to the location of that remote vehicle 14, the speed of that remote vehicle 14, information such as braking information, turn signal information and so on which indicates whether the remote vehicle 14 is preparing to turn or change lanes, and any additional information that can enable the vehicle control system 12 to ascertain the location and movement of the remote vehicle 14.

The vehicle control system 12 in this example further includes or is in communication with a visual system 36. The visual system 36 can include a display device that displays, for example, navigation information which indicates the location of the host vehicle 10 with respect to a map as understood in the art. The visual system 36 also includes the mirrors 37 of the host vehicle, such as the driver side mirror, passenger side mirror and rear view mirror. The controller 22 can receive information pertaining to the respective positions of the mirrors 37 on the host vehicle 10 and the respective tilt angles of the mirrors 37 as understood in the art.

In addition, the host vehicle 10 is equipped with at least one imaging device such as a high-speed camera. In this example, the host vehicle 10 includes a front imaging device 38-1, a rear imaging device 38-2, a driver side imaging device 38-3 and a passenger side imaging device 38-4. The imaging devices 38-1 through 38-4 are positioned on the host vehicle 10 to capture real time images (e.g. remote vehicles 14) to provide 360 degree field of view imaging about the entire exterior perimeter of the host vehicle 10. The cameras 38-1 through 38-4 are preferably solid state image pickup devices, such as charge coupled device (CCD).

The controller 22 in this example receives the image data from the imaging devices 38-1 through 38-4 and controls the visual system 36 to display images representing the images captured by the imaging devices 38-1 through 38-4 for viewing by the driver and/or the passenger(s) as discussed herein. The user such as the driver and/or passenger(s) can operate the user input devices 24 to change the images being displayed by the visual system 36. For instance, the user can control the visual system 36 to display the images captured by any of the imaging devices 38-1 through 38-4 as desired. The user can also control the visual system 36 to switch between, for example, displaying navigation information, displaying images captured by the imaging devices 38-1 through 38-4, and displaying any other type of information as understood in the art. Furthermore, the host vehicle 10 can include various types of audio and tactile devices that the controller 22 can control to provide audio and/or tactile information, such as warnings, to be perceived by the driver.

Moreover, the imaging devices 38-1 through 38-4 can be in communication with the remote vehicle determination system 34. Thus, when a remote vehicle 14 is not equipped a vehicle control system, and thus does not convey data related to the remote vehicle 14, the host vehicle is capable of determining the position and speed to the remote vehicle relative to the host vehicle. Additionally, the host vehicle may include additional external sensors (not shown) that are be capable of sensing remote vehicles or objects. Such sensors are in communication with the remote vehicle determination system 34. In one embodiment, the sensors may include long-range radar devices for object detection in front of the host vehicle 10. The front sensors may be configured to detect objects at a predetermined distance (e.g., distances up to 200 m), and thus may have a narrow field of view angle (e.g., around 15°). Due to the narrow field of view angle, the long range radar may not detect all objects in the front of the host vehicle. Thus, if desired, the front corner sensors can include short-range radar devices to assist in monitoring the region in front of the host vehicle. The rear sensors may include short-range radar devices to assist in monitoring oncoming traffic beside and behind the host vehicle. Placement of the aforementioned sensors permits monitoring of traffic flow including remote vehicles and other objects around the host vehicle, and the position of the host vehicle 10 with respect to maintaining lane position or lane departure. However, the sensors may be any desired sensors.

As further shown in FIG. 2 and in more detail in FIG. 3, the vehicle control system 12 in this example further includes or is in communication with a sensing system 40 that is located on the host vehicle 10. The sensing system 40 can include a plurality of sensors that sense various conditions of the host vehicle 10. For instance, the sensing system 40 includes an eye position detection system 42 that can include imaging and other monitoring devices as understood in the art to identify the position of the driver's eyes (i.e., the eye location of an eye of the driver within a passenger compartment of the host vehicle) for purposes discussed herein. The sensing system 40 further includes vehicle characteristic sensors that are operable to sense an operating condition of the host vehicle 10, for example, the speed (e.g., actual vehicle velocity and wheel velocity), acceleration (e.g., amount of accelerator depression), braking (e.g., amount of braking), steering wheel position (e.g., steering wheel angle), turn signal activation (e.g., right or left turn indication), yaw rate and so on pertaining to the host vehicle 10.

As will now be discussed, the controller 22 of the vehicle control system 12 is further configured to control the vehicle control system 12 on board the host vehicle 10 to move the host vehicle 10 at a location that is advantageous to the driver. In the examples discussed below, the controller 22 determines an appropriate location to move the host vehicle 10 during a lane change operation.

The host vehicle 10 can be configured as an autonomous vehicle which, as understood in the art, performs driving operations to guide the vehicle 10 to a predetermined destination without input from the driver or with minimal input from the driver. The control system for performing the autonomous vehicle operations can be included as part of the controller 22 or can be a separate controller 22 or controller 22s. The control system uses a plurality of high-speed cameras, such as imaging devices 38-1 through 38-4, to monitor areas surrounding the host vehicle 10. The cameras detect, for example, traffic lights, signs, road markers, other vehicles 14, obstacles and other points of interest, and provide visual data to the control system (e.g., the controller 22). The control system analyzes this data to control acceleration, deceleration and steering of the host vehicle 10.

For example, as shown in FIG. 4, the host vehicle 10 is travelling on a road 50 in lane 51 along with other remote vehicles 14. The imaging devices 38-1 through 38-4 capture real time images and provide image data to the autonomous vehicle control system 12. For purposes of this example, the autonomous vehicle control system 12 will be described as being included in the controller 22 which performs the autonomous vehicle control system 12 operations. As understood in the art, the controller 22 analyzes this image data, along with vehicle condition data provided by the sensing system 40, navigation and map data provided by the vehicle navigation system 28, and data pertaining to the remote vehicles 14 provided by the remote vehicle determination system 34 as discussed above, and controls driving of the host vehicle 10. That is, the controller 22 controls the acceleration, deceleration, braking and steering of the host vehicle 10 without input from the driver, or with only minimal input from the driver, to drive the host vehicle 10 along lane 51 of the road 50 as understood in the art.

However, situations may arise during which the driver may desire to assume control or partial control of the host vehicle 10 or at least monitor the activities of the host vehicle to ensure the safety of the vehicle passengers and others. For example, as shown in FIG. 4, the driver of the host vehicle 10 may desire a lane change operation. To affect the lane change operation, the driver of the host vehicle 10 may operate user inputs, or any other procedure or device, to notify the vehicle control system 12 that a lane change is desired. However, in this situation, the vehicle control system 12 may have been supplied with information not available to the driver based on the driver field of view. For example, as illustrated in FIG. 4, the vehicle control system 12, based on data from the systems described herein, will have received information regarding the remote vehicles 14 that are otherwise not seen by the driver (i.e., not in the host vehicle driver's field of view) due to the occlusion of other remote vehicles 14 or the traditional blind spot of the host vehicle 10. Thus, the driver may not have enough information, in particular, visual information, in order to make the appropriate decisions with regard to controlling the host vehicle 10 to, for example, perform a lane change operation.

In this embodiment, as shown in FIGS. 4 and 5, using the sensing system 40, the controller 22 determines the driver's field of view (i.e., visible area L). Thus, the vehicle control system 12 determines that the field of view of the host vehicle driver is not sufficient to supply the driver with enough visual information to make the appropriate decision with regard to a lane change operation. In this embodiment, the controller 22 is configured to determine a position of each of the remote vehicles, and whether each of the remote vehicles 14 is expected to reside within the field of view of the driver, and to control the vehicle control system 12 to move the host vehicle 14 in the direction of arrow A relative to the lane marker 52 (i.e., a marker defining an edge of a lane) to a position in which each of the remote vehicles is expected to reside within the field of view of the driver.

Accordingly, in this embodiment, the vehicle control system 12 moves the host vehicle in the direction of arrow A relative to the lane marker, while maintaining the host vehicle in lane 50, as shown in FIG. 5. This movement of the host vehicle, does not endanger the host vehicle occupants, since the host vehicle maintains lane integrity, but increases the driver field of view. That is, as shown in FIG. 5, the remote vehicle that was previously occluded FIG. 4 is now visible within the host vehicle driver field of view (see the area $V_1$). Moreover, the remote vehicle that had previously resided in the host vehicle driver blind spot (FIG. 4) now resides within the host vehicle driver field of view via the right side mirror (see the area $V_2$). Thus, the driver of the host vehicle is now supplied with sufficient information to determine whether a lane change operation is appropriate.

Additionally, in some circumstances, the driver of the host vehicle may be confused as to whether a lane change operation of the host vehicle performed by the vehicle control system 12 is appropriate. That is, vehicle control system 12 is capable of determining that although a lane change operation does not appear appropriate to the host vehicle driver, a lane change operation is sufficiently safe.

Figure 6:
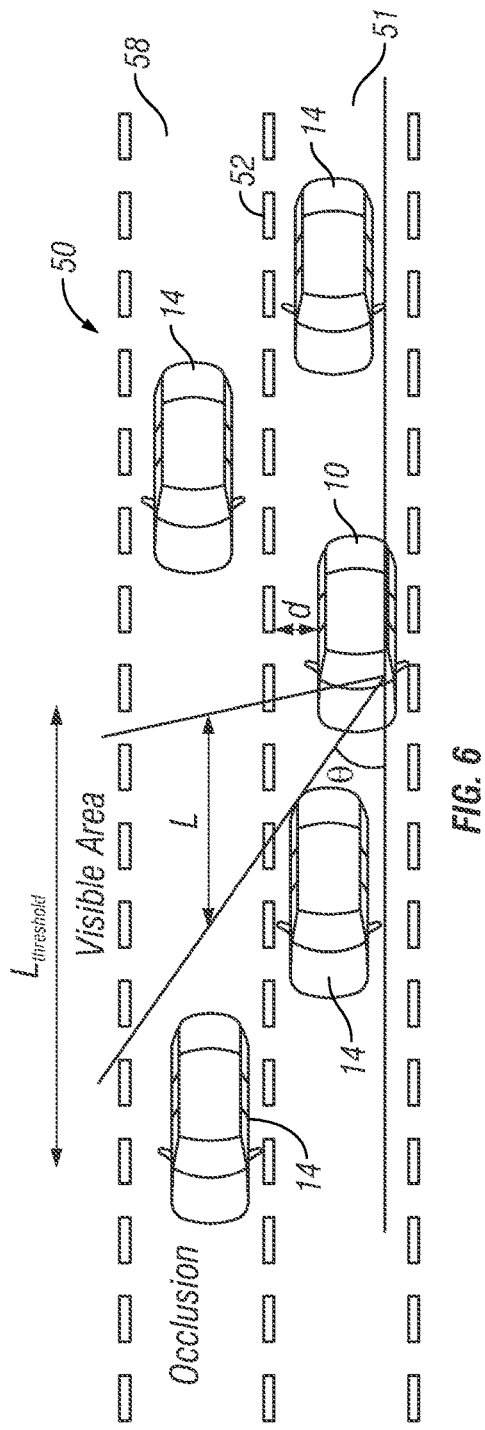
FIG. 6 is a diagrammatic view of the host vehicle and remote vehicles traveling on a road illustrating the visible area of the driver.
Figure 7:
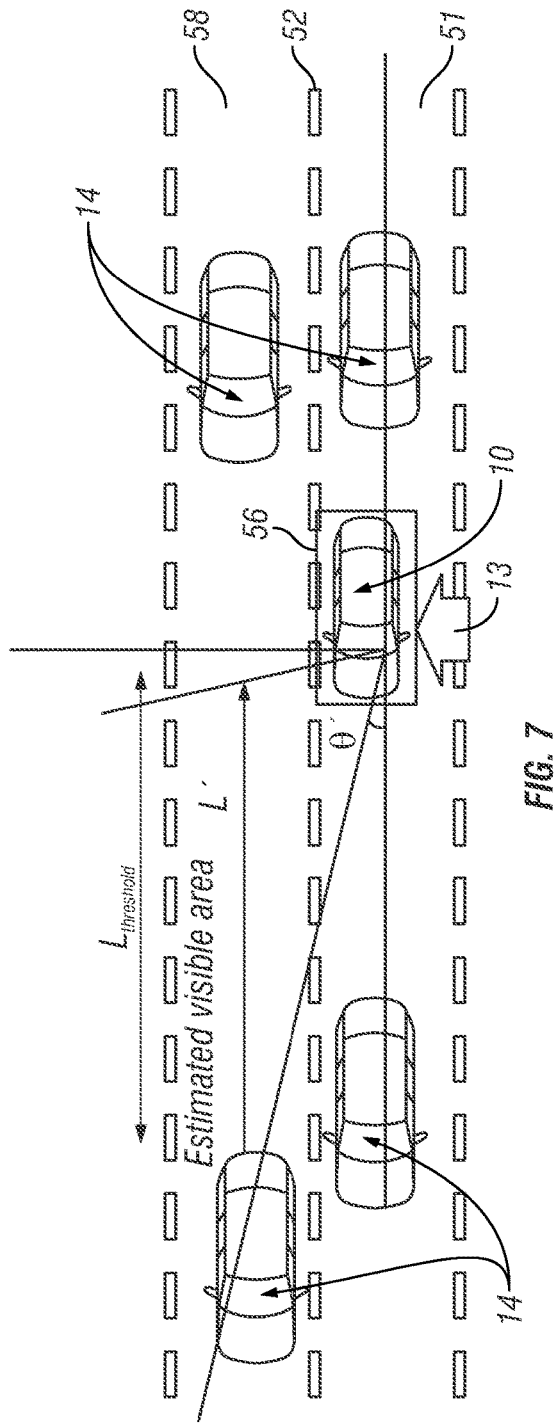
FIG. 7 is a diagrammatic view of the host vehicle and remote vehicles traveling on the road shown in FIG. 6 the illustrating the visible area of the driver with the host vehicle moving toward the lane marker.

As shown in FIGS. 6 and 7, the vehicle control system 12, prior to executing a lane change operation may determine the visible area L (field of view) of the driver of the host vehicle using the sensing system 40, as described above. In one embodiment, the controller 22 can determine the visible area L by determining the angle θ between the remote vehicle 14 in front of the host vehicle 10 and the calculated sight limit of the driver to the right of the host vehicle 10. When controller 22 determines that the visible area L is less than a predetermined field of view (i.e., $L_{threshold}$) and/or the distance d to the lane marker M is less than a predetermined distance, the controller 22 is configured to control the vehicle control system 12 to move the host vehicle 10 relative to the lane marker 52 in the direction of arrow B to a lateral intermediate position 56 adjacent the lane marker 52, as illustrated in FIG. 7.

Figure 8:
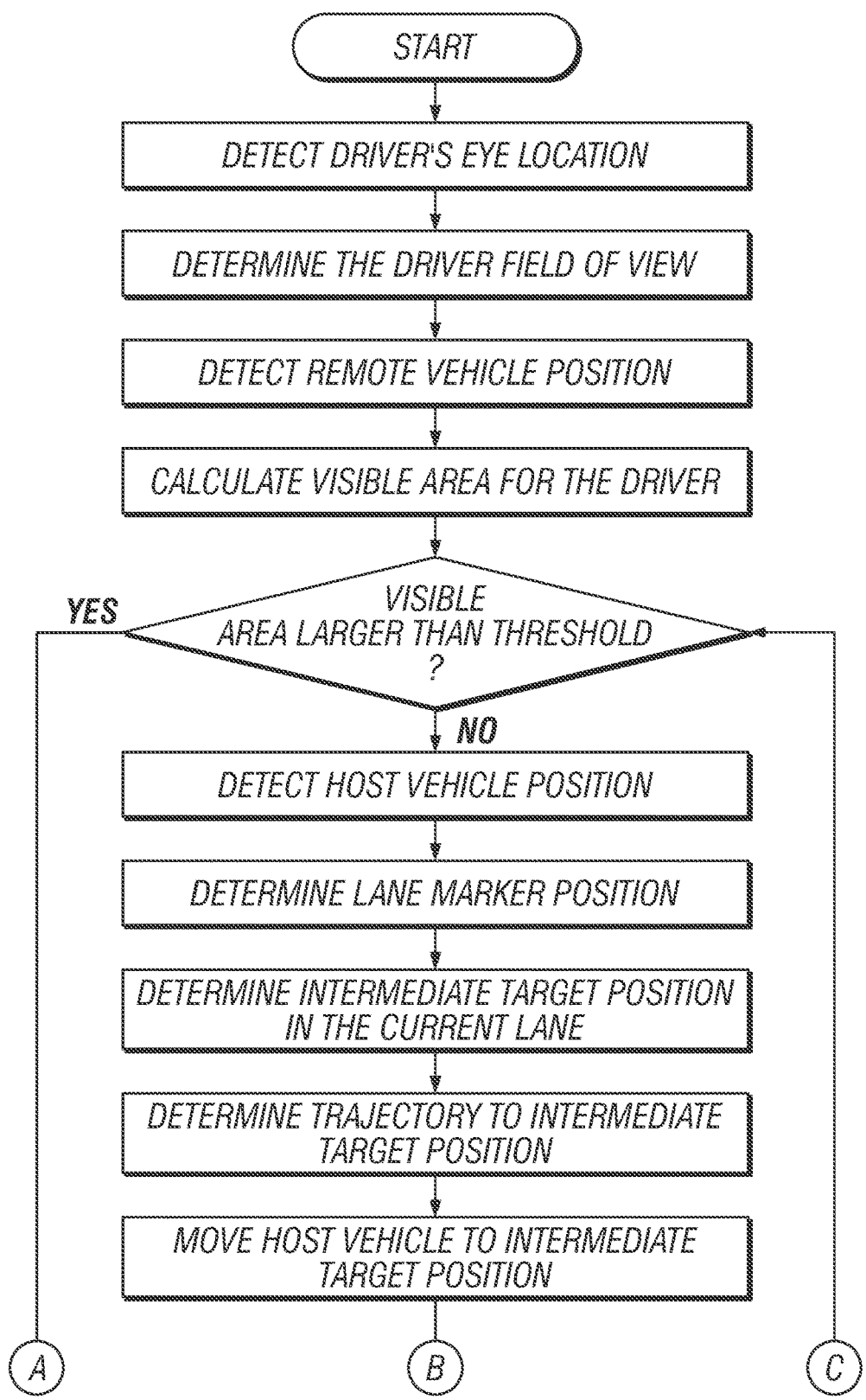
FIG. 8 is a flowchart illustrating an example of operations performed by the vehicle control system according to embodiments disclosed herein.
Figure 8:
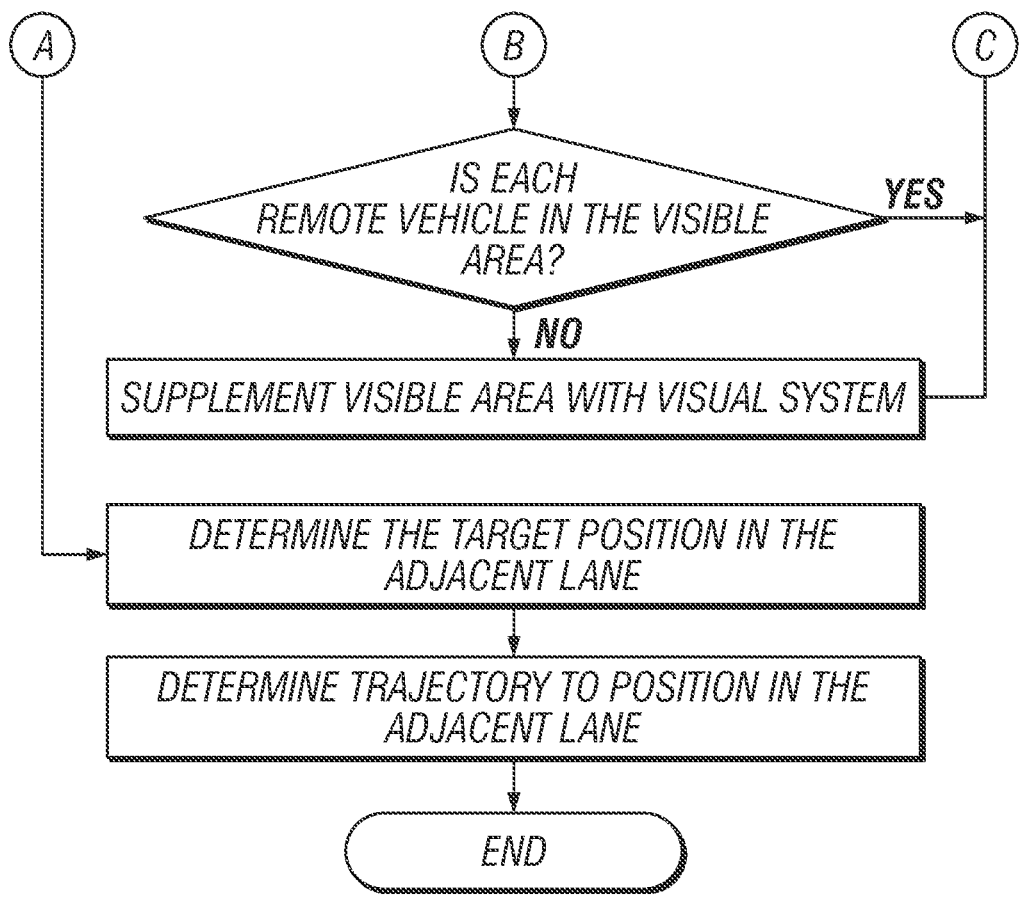
Figure 9:
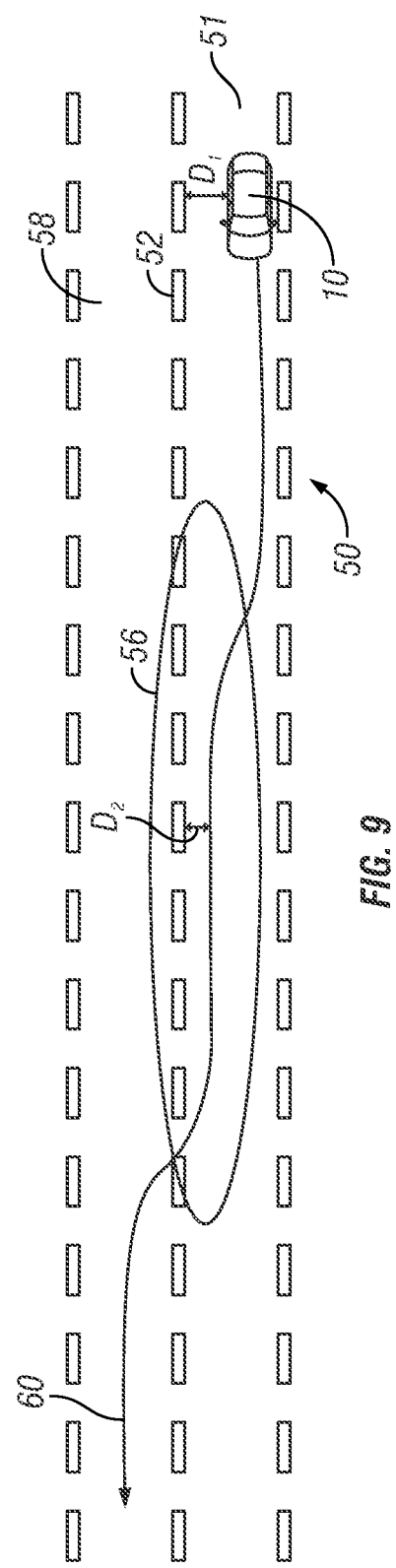
FIG. 9 is a diagrammatic view of the host vehicle track during a lane change operation according to an embodiment.

In other words, in some instances, the driver of the host vehicle may wish to monitor the conditions during a lane change operation, and as illustrated in FIG. 7, a lane change operation of the host vehicle does not appear appropriate, based on the visible area L. However, as illustrated in FIG. 8, remote vehicle determination system can estimate the visible area L', based on the data obtained from the remote vehicles and/or through the sensing system 40. Thus, the vehicle controller 22 system is capable of determining that although a lane change operation does not appear appropriate, such a lane change will become appropriate. The vehicle control system 12 can estimate that by the time the lane change operation is performed the remote vehicles 14 will be situated such that L' will be greater than $L_{threshold}$, and the angle θ' between the forward sightline of the driver and the host vehicle 10 to the right and front of the host vehicle 10 is sufficient to enable the driver of the host vehicle 10 to view at least a portion of the remote vehicle(s) 14. That is, controller 22 is configured to determine a position of each of the remote vehicles 14, and whether each of the remote vehicles 14 is expected to reside within the field of view of the driver, and to control the vehicle control system 12 to move the host vehicle 10 relative to the lane marker 52 to a position in which each of the remote vehicles 14 is expected to reside within the field of view of the driver.

Thus, similarly to as described above, the vehicle control system 12 will calculate a location to move the remote vehicle relative to the lane marker in a the direction of arrow B to a lateral intermediate target position 56 that will enable the driver of the host vehicle to view the position and location of each of the remote vehicles 14. In one embodiment, the distance d to the lane marker 53 is used to calculate the intermediate target position 56. Accordingly, once the host vehicle 10 is moved to this intermediate target position 56, the driver of the host vehicle 10 will be more comfortable with the decision to affect a lane change operation.

Accordingly, the vehicle control system 12 according to the disclosed embodiments uses visual information pertaining to a visual condition of the driver of the host vehicle 10 to control the autonomous vehicle control system 12 to move the host vehicle 10 at a location 56 based on the visual condition and at least one point of interest external to the host vehicle 10. In the example shown in FIG. 8, the controller 22 can perform operations as shown in the flowchart of FIG. 8 to control the autonomous vehicle control system 12 to move the host vehicle 10 to an intermediate lateral target position or location. Although the example shown in FIG. 8 and discussed below pertains to moving the host vehicle 10 to an intermediate lateral target position or location, the embodiments described herein can be used to determine any suitable situation.

First, the sensors detect an eye position of the driver of the host vehicle 10. It is noted that the eye position of the driver can be sensed using the sensors described herein, or can be estimated based on other features of the driver or an estimated general eye position may be used. Next, the controller 22 calculates the driver field of view based on the driver's eye location. The remote vehicle determination system 34 (or any other suitable system of device) detects the position and location of remote vehicles 14. Based on the remote vehicles position and/or location and the calculated visible area of the driver, the controller 22 determines whether the visible area is larger than the threshold area. If the visible area is larger than the threshold area, the vehicle control system 12 may calculate or determine the target position in the adjacent lane. The controller 22 then determines the trajectory to position in the adjacent lane.

If the visible area is not larger than the threshold area, the controller 22 determines the lane marker position, and the distance to the lane marker 52. Based on this data, the controller 22 determines the intermediate target position in the current lane, the trajectory to the intermediate target position, and moves the host vehicle 10 relative to the lane marker to the intermediate target position. The vehicle control system 12 then determines if the remote vehicles 14 are visible. If the remote vehicles are not visible the vehicle control system 12 can supplement the field of view of the driver of host vehicle with cameras views through the visual system 36. If each of the remote vehicles 14 are in the visible area or if the control system 12 supplements the field of view of the driver of host vehicle 10, the controller 22 then determines whether visible area is larger than the threshold L. If the visible area is larger than the threshold, the vehicle control system 12 may calculate or determine the target position in the adjacent lane 58. The controller 22 then determines the trajectory to position in the adjacent lane 58.

If the visible area is not larger than the threshold area, the controller 22 performs the steps as described above.

FIG. 8 illustrates the overall trajectory calculation for the lane change operation from lane 51 to lane 58. The trajectory of the host vehicle 10 may be calculated using the specific known characteristics of the host vehicle 10 and the information regarding the remote vehicles 14. That is, as shown, the vehicle control system 12 of the host vehicle 10 calculates the intermediate target position 56 to enhance or supplement the visual area of the host vehicle driver. Thus, the host vehicle is originally located at a first distance $D_1$ from the lane marker 52, and moves to the intermediate target position 56 located at a second distance $D_2$ from the lane marker 52. Preferably, the second distance $D_2$ is closer to the lane marker than the first distance $D_1$. The host vehicle 10 can maintain this position or location for a predetermined time and/or distance then move to the calculated position 60 in the adjacent lane 58. That is, the lane change operation is performed (i.e., moving the vehicle to an adjacent lane) after the host vehicle 10 is moved a first distance $D_1$ from the lane marker to a second distance $D_2$ from the lane marker, and maintains the second distance for more than at least one of a predetermined period of time and a predetermined distance.

Thus, in one embodiment, the sensing system 40 is configured to sense at least one operating condition of the host vehicle 10 (such as speed, location, steering angle, yaw, etc.) and the operating condition of the remote vehicles 14 (such as speed, location, steering angle, yaw, etc.), and the controller 22 is configured to control the autonomous vehicle control system 12 to move the host vehicle 10 to an adjacent lane based 58 on the visual condition, the position of the host vehicle 10 and the at least one operating condition.

As is understood from the description of the embodiments described herein, the controller 22 is configured to control the autonomous vehicle control system 12 to move the host vehicle 10 to an adjacent lane after determining that the remote vehicles 10 are within the field of view of the driver. Such a system will improve a driver's comfort level and driving experience, while also improving the safety of the host vehicle 10.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts. Also as used herein to describe the above embodiment(s), the following directional terms "forward", "front", and "rear", as well as any other similar directional terms refer to those directions of a vehicle equipped with the autonomous vehicle control system. Accordingly, these terms, as utilized to describe the present invention should be interpreted relative to a vehicle equipped with the autonomous vehicle control system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as, "about" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An autonomous vehicle control system comprising:
   a sensing system disposed on a host vehicle and configured to sense a visual condition of a driver of the host vehicle;
   a remote vehicle determination system disposed on the host vehicle, and being configured to determine a position of a remote vehicle in an area adjacent the host vehicle; and
   a controller configured to determine whether the remote vehicle resides within a field of view of the driver based on the visual condition and the position of the remote vehicle, and configured to control the autonomous vehicle control system to move the host vehicle relative to a lane marker based on the visual condition and the position of a remote vehicle to a position in which the remote vehicle is expected to reside within the field of view of the driver.

2. The autonomous vehicle control system according to claim 1, wherein
   the controller is configured to control the autonomous vehicle control system to move the host vehicle to an adjacent lane after moving relative to the lane marker.

3. The autonomous vehicle control system according to claim 1, wherein
   the sensing system includes at least one camera configured to capture an image of the remote vehicle.

4. The autonomous vehicle control system according to claim 1, wherein
   the visual condition represents a detected eye location of an eye of the driver within a passenger compartment of the host vehicle; and
   the controller is configured to estimate the field of view of the driver based on the detected eye location.

5. The vehicle control system according to claim 1, wherein
   the remote vehicle is one of a plurality of remote vehicles; and
   the controller is configured to determine a position of each of the remote vehicles, and whether each of the remote vehicles is expected to reside within the field of view of the driver, and to control the autonomous vehicle control system to move the host vehicle relative to the lane marker to a position in which each of the remote vehicles is expected to reside within the field of view of the driver.

6. The autonomous vehicle control system according to claim 1, wherein
   the remote vehicle determination system is configured to determine when the remote vehicle is not in the field of view of the driver, and the controller is configured to control the autonomous vehicle control system to move the host vehicle relative to the lane marker to a position in which the remote vehicle is expected to reside within the field of view of the driver.

7. The autonomous vehicle control system according to claim 6, wherein
   the controller is configured to control the autonomous vehicle control system to move the host vehicle to an adjacent lane after determining that the remote vehicle is within the field of view of the driver.

8. The autonomous vehicle control system according to claim 1, wherein
   the controller is configured to determine whether the field of view is less than a predetermined field of view.

9. The autonomous vehicle control system according to claim 8, wherein the controller is configured to control the autonomous vehicle control system to move the host vehicle relative to the lane marker when the field of view is less than the predetermined field of view.

10. The autonomous vehicle control system according to claim 1, wherein
the sensing system is further configured to sense at least one operating condition of the host vehicle; and
the controller is further configured to control the autonomous vehicle control system to move the host vehicle to an adjacent lane based on the visual condition, the position if the host vehicle and the at least one operating condition.

11. The autonomous vehicle control system according to claim 10, wherein
the at least one operating condition includes at least one of a speed and a steering angle of the host vehicle.

12. The autonomous vehicle control system according to claim 1, further comprising
a host vehicle location system configured to determine a present location of the host vehicle; and
the controller is further configured to control the autonomous vehicle control system to move the host vehicle to an adjacent lane based on the visual condition, the position of the remote vehicle and the present location of the host vehicle.

13. The autonomous vehicle control system according to claim 12, wherein
the controller is configured to determine a target position for the host vehicle based on the present location of the host vehicle, the position of the remote vehicle and the visual condition, the target position being a position adjacent the lane marker.

14. The autonomous vehicle control system according to claim 13, wherein
the controller is configured to calculate the target position based on a distance between the present position of the host vehicle and the lane marker.

15. A method of operation of an autonomous vehicle, the method comprising:
sensing, via a system disposed on a host vehicle, a visual condition of a driver of the host vehicle;
determining a distance of a vehicle to a lane marker defining an edge of a lane;
determining a lane change operation of the vehicle is desired;
determining, via a remote vehicle determination system disposed on the host vehicle, a position of a remote vehicle in an area adjacent the host vehicle;
determining, via a controller, whether the remote vehicle resides within a field of view of the driver based on the visual condition and the position of the remote vehicle, and controlling the autonomous vehicle control system to move the host vehicle relative to a lane marker based on the visual condition and the position of a remote vehicle to a position in which the remote vehicle is expected to reside within the field of view of the driver;
moving the vehicle a first distance from the lane marker to a second distance from the lane marker in response to the determination of the desired lane change operation and whether the remote vehicle resides within a field of view of the driver, the second distance being less than the first distance; and
performing a lane change operation after the vehicle is at the second distance for more than at least one of a predetermined period of time and a predetermined distance.

16. The method of claim 15, further comprising
moving the vehicle to an adjacent lane after moving the vehicle a first distance from the lane marker to a second distance from the lane marker.

17. The method of claim 15, further comprising
determining whether the field of is less than a predetermined a predetermined field of view.

18. The method of claim 17, wherein
the moving the vehicle a first distance from the lane marker to a second distance from the lane marker includes moving the vehicle when the field of view is less than the predetermined a predetermined field of view.

* * * * *